United States Patent [19]

Pagnoni

[11] 4,001,074
[45] Jan. 4, 1977

[54] METHOD AND APPARATUS FOR FORMING AND PRESSING FOIL AND BOARD LAMINATES

[75] Inventor: Franco Pagnoni, Monza (Milan), Italy

[73] Assignee: Fratelli Pagnoni S.P.A., Monza, Milan, Italy

[22] Filed: Sept. 30, 1975

[21] Appl. No.: 618,115

[30] Foreign Application Priority Data

Feb. 7, 1975   Italy ................................ 20054/75

[52] U.S. Cl. .............................. 156/580; 100/215; 425/DIG. 48
[51] Int. Cl.[2] .................. B32B 31/00; B30B 15/30
[58] Field of Search ........... 156/580, 583; 100/215, 100/199; 425/DIG. 48

[56] References Cited

UNITED STATES PATENTS

| 2,418,065 | 3/1947 | Bobst ................................. | 100/215 |
| 3,073,499 | 1/1963 | Middleton, Jr. et al. ... | 425/DIG. 48 |
| 3,416,592 | 12/1968 | Hutchinson ........................ | 100/215 |
| 3,909,343 | 9/1975 | Posselt .............................. | 156/583 |

*Primary Examiner*—Douglas J. Drummond
*Attorney, Agent, or Firm*—McGlew and Tuttle

[57] ABSTRACT

A method for forming and pressing a foil to a board made of wood shavings, fibers and the like, in a double plate press having at least one first plate movable in a closing direction toward the other second plate and employing a first pivotal lever having a support surface and a second pivotal lever forming a top clamping surface, comprising placing at least one foil in alignment with at least one surface of the board and depositing the board and the foil onto a support surface. Thereafter, the second lever is pivoted in a first direction in order to engage a clamping roller at the end thereof onto the board. The two levers with the supported and clamped board are then displaced longitudinally into the press between the two press plates. The second lever is then rotated in an opposite direction to unclamp the board and the press is closed by moving the plates relatively toward each other to effect a gradual lateral withdrawal of the support surface on the first pivotal lever to completely release the board in the press as the press plates are closed.

8 Claims, 11 Drawing Figures

METHOD AND APPARATUS FOR FORMING AND PRESSING FOIL AND BOARD LAMINATES

FIELD AND BACKGROUND OF THE INVENTION

This invention relates in general to a method and apparatus for handling laminates, boards, etc., which are to be delivered to a press and, in particular, to a new and useful method and apparatus for picking up a board which has been moved into association with a foil sheet and transferring the board over ionizing bars in order to fix the sheet to the board and sebsequently position the board into a press where it is held until the two press plates of the press come together by means which effect the simultaneous release of the board when the two plate presses come together.

DESCRIPTION OF THE PRIOR ART

The present invention is particularly directed to the formation of compressed wood shaving or fiber panels along with associated facial coverings in the form of foils or sheets. A difficulty in the processing of such materials is that there is a tendency for the foil sheet to become disassociated from the board before it is positioned in the press and it is very important that the board with the foil sheet be held up until the time it is placed in the press and contacted by the hot press plates. It is essential that when the press is released by the holding means that it is immediately contacted by the press plates and brought up to a working pressure.

In the formation of such composite boards, a resin impregnated paper sheet is placed over the board, and when the board and the paper sheet come into contact with the press, there is a tendency for the resin to become fluid very quickly and to polymerize. For this polymerization to take place in an orderly manner and without causing damage, the polymerization should occur when the pressure is applied to the sheet and, preferably, not before this occurs. In the known methods, this action is not achieved satisfactorily, particularly in respect to the use of vertical presses, in which it is desirable that the fluidizing of the resin occurs substantially at the same time as the application of pressure but, up to the present time, this occurs three or more seconds before this is possible. With the use of improved melamine resins, this time may be somewhat shortened but there is a need for a process in which a more homogeneous product and increased output can be obtained by reducing the critical time in which the resin of the board and paper laminate fluidized until the working pressure of the press is effected.

SUMMARY OF THE INVENTION

In accordance with the invention, there is provided a system for engaging a board after a foil sheet has been associated therewith from each of its sides on roller supports with a clamping roller overlying the board. The mechanism includes means for transferring the held board into a press and for holding the board until the press plates begin closing together at which time, the mechanism is operated by this closing to move outwardly laterally of the press and gradually release the board until full release occurs when the press plates come together. The mechanism is contained on a carriage which is guided on rollers for movement longitudinally of the press and alongside each side thereof.

Accordingly, it is an object of the invention to provide an improved method of forming a composite board with a sheet or foil thereon which is picked up and transferred into association with a press by a mechanism which is operated by movement of the press to gradually release the board and to withdraw laterally from the press as the press plates close together.

A further object of the invention is to provide an apparatus for transferring board which is to be laminated with a foil or sheet and which includes a roller mechanism carried on a carriage which is displaceable longitudinally alongside and to one end of the press and which includes a support roller on one pivotal lever which is engaged below the board and a clamping roller which is carried on a clamping lever which is rotated over the board so as to press the clamping roller onto the board and wherein mechanism is provided for shifting the levers during movement of the press to open the clamping lever and displace it laterally alongside the press and to gradually withdraw the support roller so that the board is deposited on the press as the plates thereof close together.

A further object of the invention is to provide an apparatus for handling composite board and placing them in a press, which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 7:
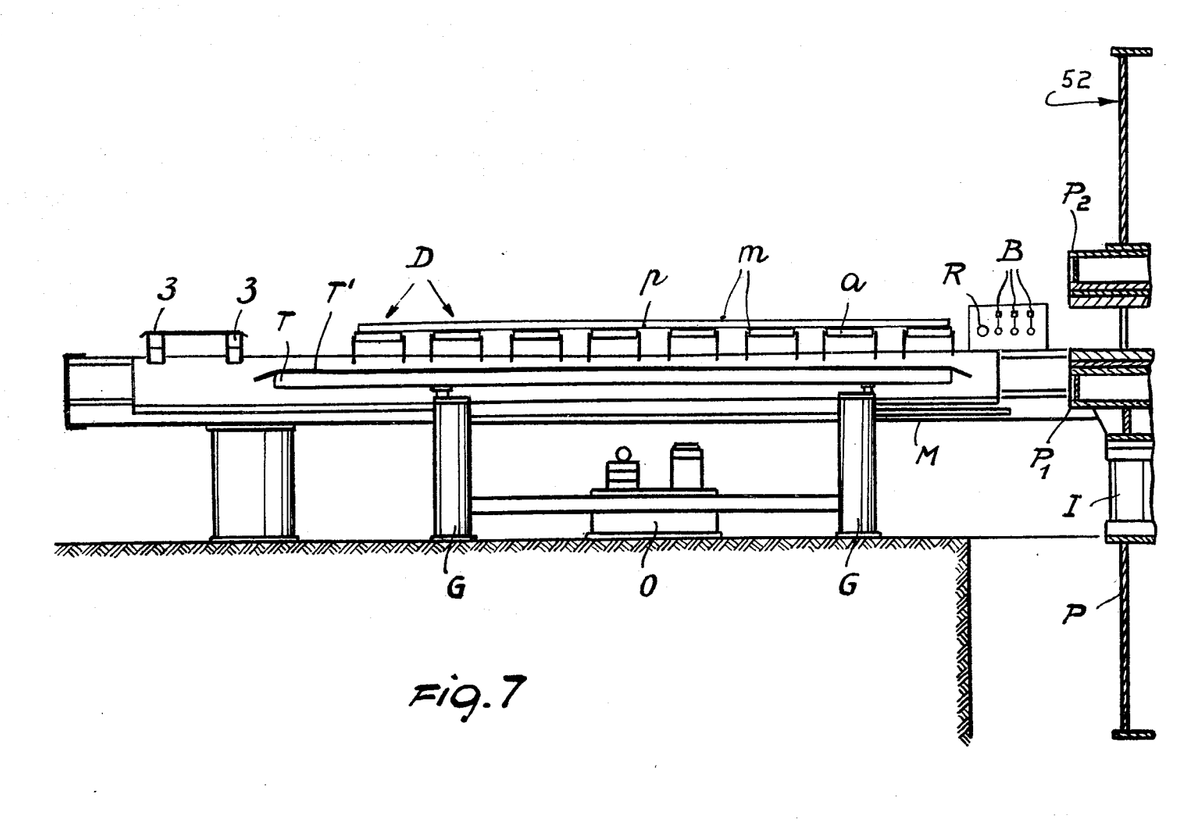
FIG. 7 is an elevational view of the apparatus taken along the line X—X in FIG. 5.
Figure 8:
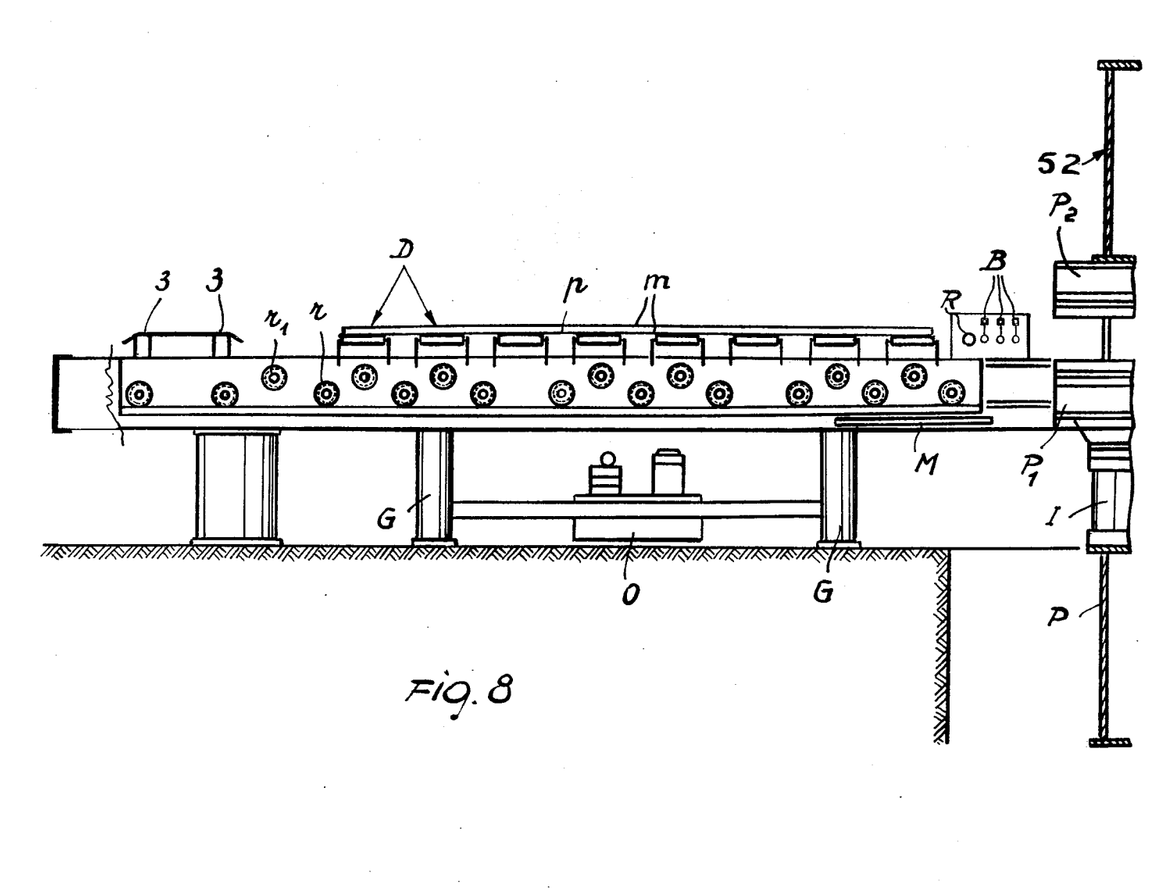
FIG. 8 is a side elevational view of the apparatus.
Figure 9:
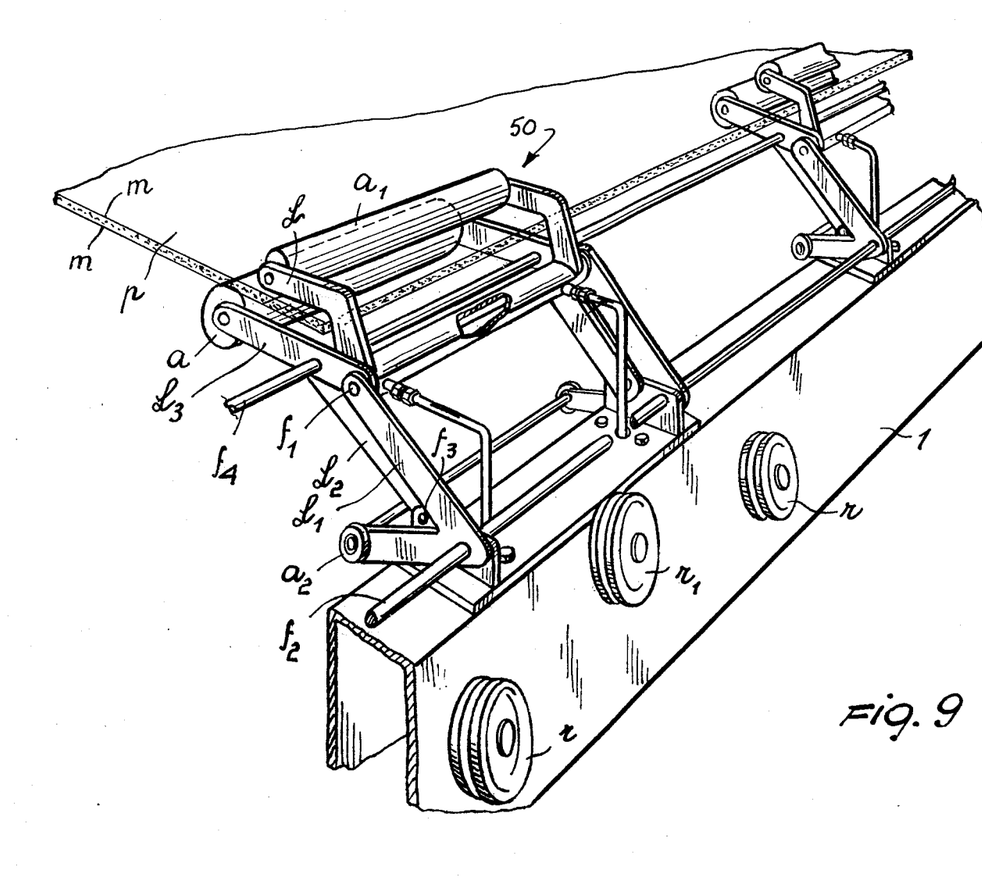
FIG. 9 is a front top perspective view of the board transferring mechanism.

Referring to the drawings particular, the invention embodied therein, comprises an apparatus for engaging and transferring a composite board made up of a board base $p$ of wood shavings, pressed wood, fiber and the like, which has a foil sheet $m$ on at least one, and preferably both, side faces, (FIGS. 1 and 2). ). The apparatus includes a table T, as shown in FIG. 7, having a lining of a sheet T' which is preferably of velvet, felt or similar material, and which is located on the same level as a support surface $a$ in the form of a roller, as shown in FIG. 1, which is rotatably carried at the outer end of a lever $L_3$ of a board transfer mechanism, generally designated 50, (FIGS. 1 and 2).

Panel $p$ is first associated with foils or sheets of paper laminates or films $m$ which are applied over both surfaces when the panel $p$ is in a horizontal position. To effect association of the foils with panel $p$, the sheets may be fed either mechanically or manually onto table T in successive phases. Table T is supported on legs which comprise piston and cylinders G which may permit its raising or lowering and, in addition, there is an oleodynamic system O below table T.

In accordance with a feature of the invention, the panel or board $p$ is transferred by individual transfer mechanisms 50 arranged in an assembly D on each side of table T and, in the embodiment illustrated, each separate pickup mechanism 50 is associated with a carriage on each side. The carriage is in the form of a beam 1, having one or more sets of rollers $r$, $r_1$ which engage with respective rail elements $g_1$ which extend alongside the complete length of the table and beyond the table past an ionizing station having a transverse roller R and ionizing bars B and past each side of a hot press, generally designated 52, which includes a top plate $P_2$ and a lower plate $P_1$ which is movable relatively to each other to close the space therebetween to effect the hot pressing of the composite board. The linear motor M is provided, as shown in FIGS. 1 and 2, to drive the carriage beam 1 so that it may move between the table T and the press 52 to effect the picking up of the board with the foil or sheets from the table and to transfer the board into the press. The carriage beam on the opposite side from that shown in FIG. 1 is designated 2, and the two beams 1 and 2 are joined together by two parallel cross-beams 3, 3.

Figure 1:
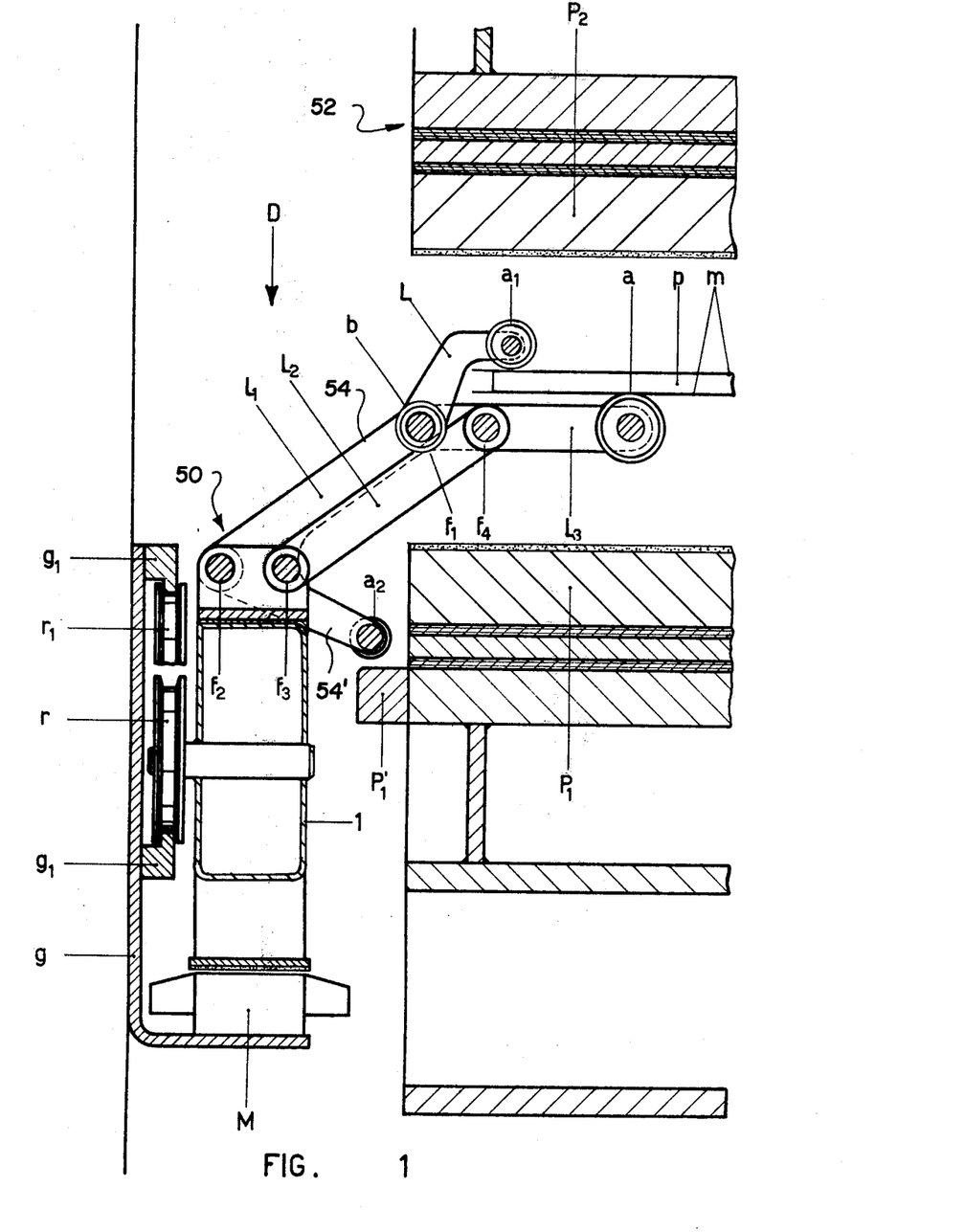
FIG. 1 is an enlarged transverse sectional view of a press having an operating mechanism for positioning composite boards therein constructed in accordance with the invention.
Figure 2:
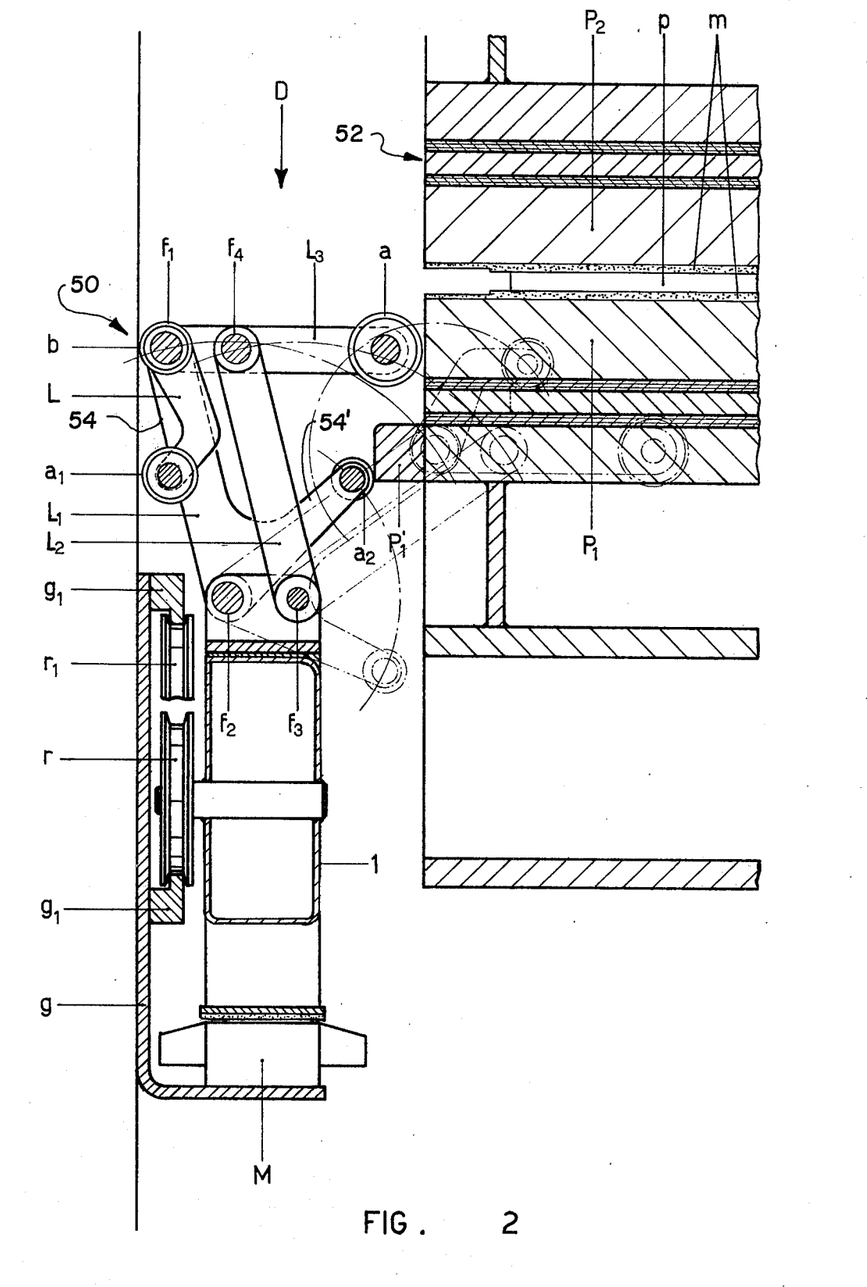
FIG. 2 is a view similar to FIG. 1 with the parts shown in an advanced position of operation.

As best seen in FIGS. 1 and 2, each transfer mechanism comprises first and second levers $L_1$ and $L_2$ which are pivoted at $f_2$ and $f_3$ on the beam 1 and which form a parallel linkage together with the support lever $L_3$ carrying the support roller or surface $a$. Lever $L_1$ is a double-arm lever and it includes a first arm portion 54 which carries a pneumatic cylinder $b$ which is rotatably journalled in respect to a pivot pin $f_1$ which is spaced from a pivot $f_4$ of a lever $L_3$. Lever $L_1$ also includes an arm portion or control lever 54', which is provided with an actuation end or roller $a_2$ and which extends laterally of the associated mechanism 50 to project over a bearing $P_1'$ of the plate press 52. The clamping lever L is carried on the pneumatic cylinder $b$ and may be rotated thereby, for example, between the non-operative position shown in FIG. 2 to the operative position shown in FIG. 1 in which it is clamped over the composite panel $p$ with the foil sheets $m$, $m$.

Figure 5:
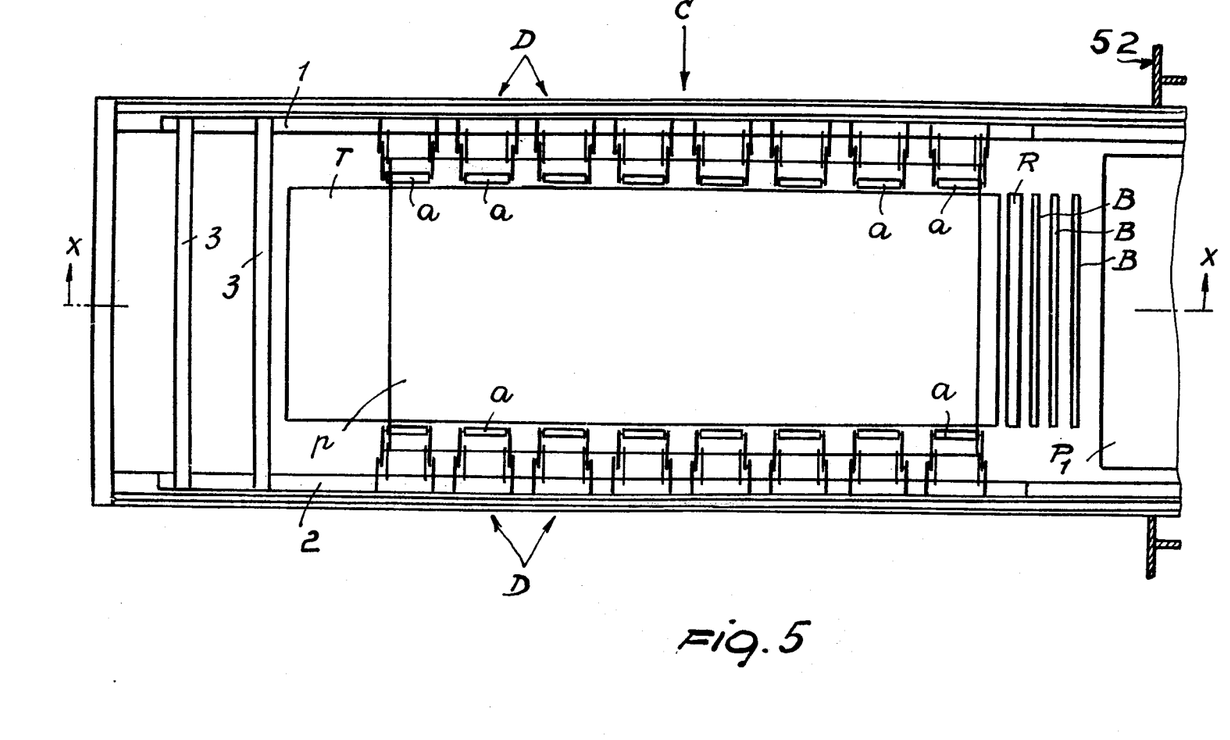
FIG. 5 is a partial top plan view of the board stacking table and ionizing device associated with the press shown in FIG. 1.
Figure 6:
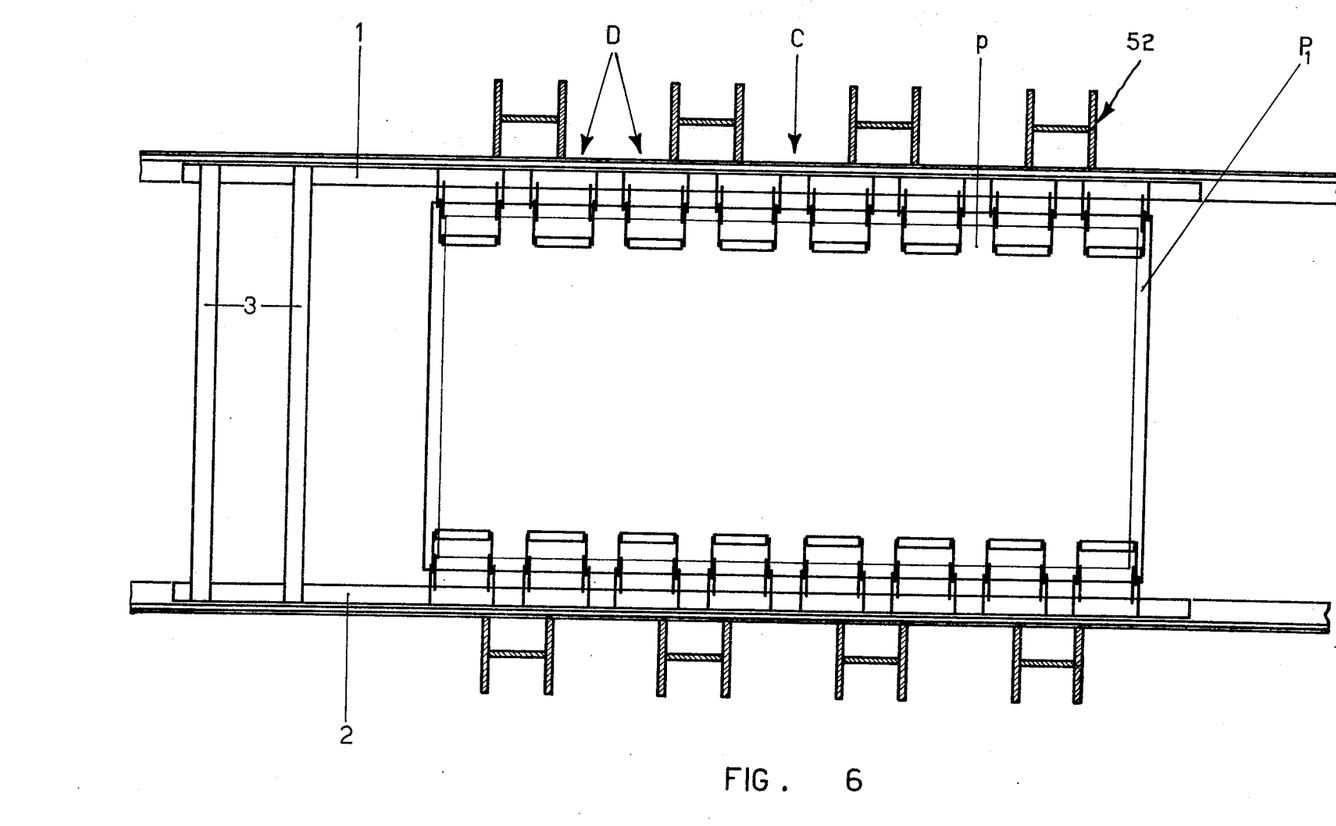
FIG. 6 is a view similar to FIG. 5 indicating the operating position of the clamping lever and rollers.

After the composite plate to be pressed is assembled on table T, control means connected to operating mechanism 50 (and not shown) effect the rotation of clamping lever L by 180° from the position shown in FIG. 2 to clamp over the top of a panel $p$ after it is first positioned over the support roller or surface $a$ after the lever arms $L_1$ and $L_2$ are pivoted to the right when they are located below the panel sides on the table T. The clamping rollers $a_1$ then engage down on table T, as shown in FIGS. 5, 6 and 1, and the levers $L_1$ and $L_2$ are raised by counterclockwise movement thereof to the position shown in FIG. 1 at which the panel $p$ is located so as to be aligned with the space between the plates $P_1$ and $P_2$ of hot press 52. The carriage assemblies D then all move together along the guide rails $g_1$, $g_1$ to bring the plate first over the ionizing station with the ionizing bars B so as to electrostatically fix the foil sheets to the board just prior to pressing. Table T, as shown in FIG. 7, may be lowered by the oleodynamic system O which operates through the supporting legs G of Table T. During the movement of the board, it passes over transverse roller R adjacent the ionizing station with the bars B. The ionizing bars electrostatically charge the lower paper sheet $m$ and the upper paper sheet $m$ to make it adhere perfectly to panel $p$.

After the panel with the sheets is moved into the press between plates $P_1$ and $P_2$, each of the control levers 54' with actuation end or roller $a_2$ is located over a bearing piece $P_1'$, as shown in FIG. 1.

Figure 3A:
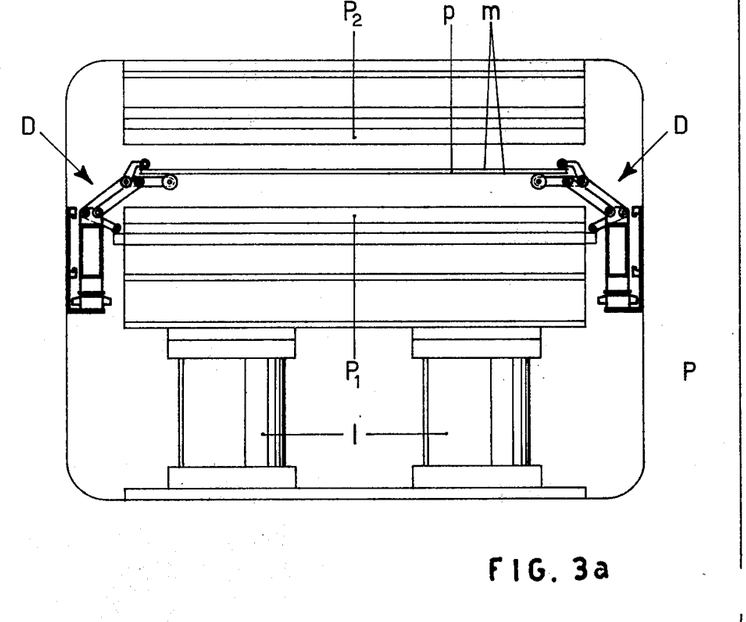
FIG. 3a is an end elevational view of the plate press shown in FIG. 1 but on a reduced scale.

Thereupon, the plate press is closed, for example, by moving the lower plate $P_1$ toward the upper plate $P_2$ to move the bearing $P_1'$ against the actuating end or roller $a_2$ and cause the pivoting of the levers $L_1$ and $L_2$ in a counterclockwise or outer direction so that the timing of the movement is in proportion to the closing movement of the presses. Just before this movement is effected, as shown in sequences in the drawings of FIGS. 3$a$, 3$b$, 4$a$ and 4$b$, the clamping roller $a_1$ is rotated counterclockwise, as shown in FIG. 3$b$, to move it outside of the lateral sides of the press plates $P_1$ and $P_2$.

Figure 3B:
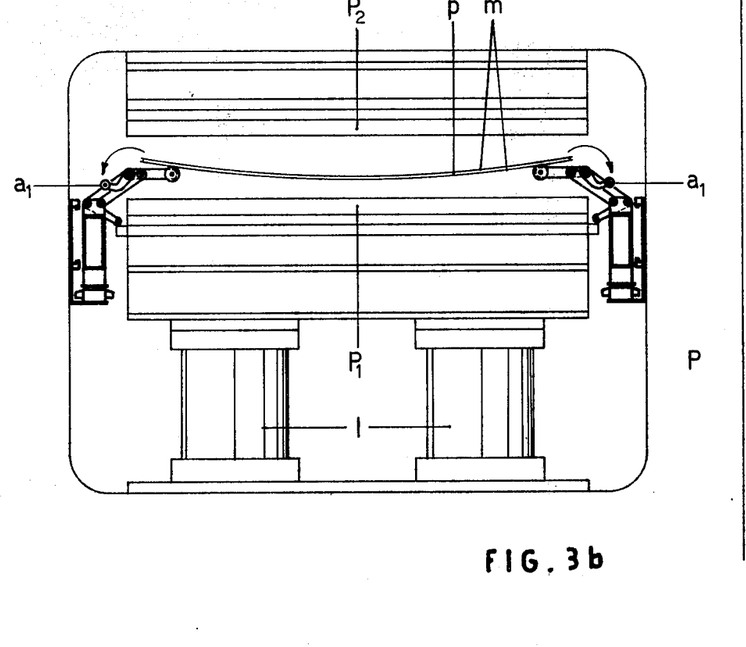
FIG. 3b is a view similar to FIG. 3a showing an advanced position of operation.
Figure 4A:
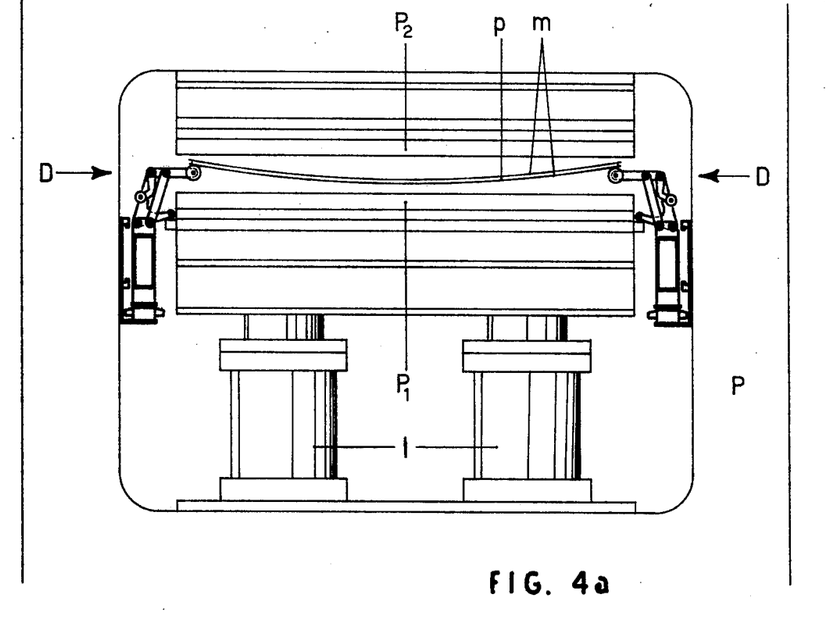
FIG. 4a is a view similar to FIG. 3a of a still further advanced position of operation.
Figure 4B:
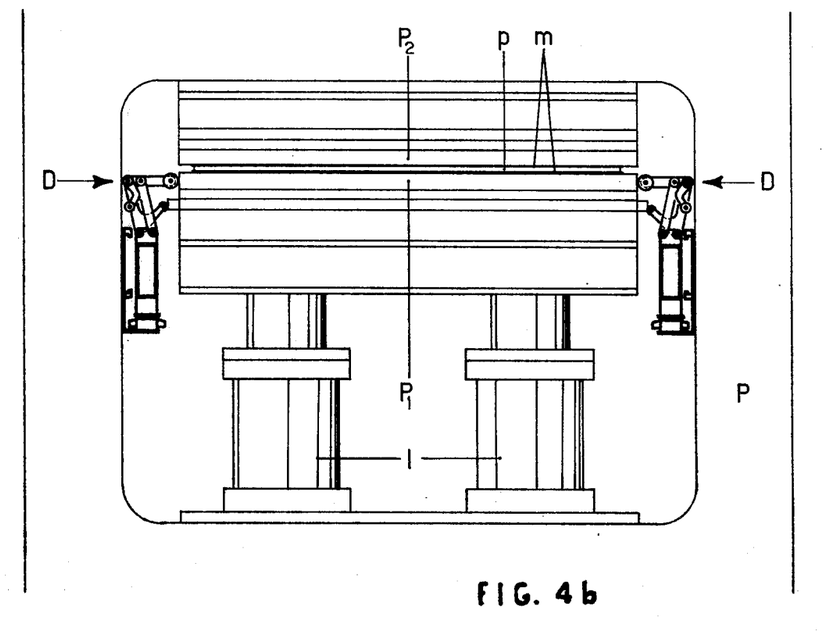
FIG. 4b is a view similar to FIG. 3a of still a further advanced position of operation of the parts.

Further upward movement of plate $P_1$ causes a continued lateral outer movement of the lever $L_3$ with the support surface $a$ until the movement from the position shown in FIG. 3$b$ to the position shown in FIG. 4$a$ and then to the position 4$b$ is accomplished. The position shown in FIG. 4$b$ is achieved just as the two plates $P_1$ and $P_2$ are in a pressure applied position to act upon the panel $p$.

With the press 52 in the closed position, the carriage designated C and which includes all of the support devices D moves as a unit backwardly to the table to its starting position ready to begin a new cycle.

With the inventive arrangement, the panel $p$ of the hot press is moved into association between plates $P_1$ and $P_2$ only when the two plates are moved substantially to a closed position at which they are capable of immediately applying pressure to the panel so as to obtain a proper fixing of the sheet with the board.

While a specific embodiment of the invention has been shown and described in detail to illustrate the application of the principles of the invention, it will be understood that the invention may be embodied otherwise without departing from such principles.

What is claimed is:

1. A device for transferring panels, boards, etc. to a press, comprising a press having first and second press plates relatively movable toward each other to compress a panel or board therebetween and away from each other to open said press, a panel support spaced from said press, first and second trackways extending between said panel support and the opposite end of said press from said panel support, at least one carriage movable along each trackway between a position alongside said support to a position alongside said press, a pickup mechanism on each carriage including pivotal lever means including a lever pivotal on said carriage toward and away from said panel support and said press and having a support surface engageable below the panel to support it, means to move said carriage, shifting means to shift said lever means and said lever to shift the support surface thereof below said panel for support of the panel thereon, said carriage being movable with said lever means to carry said panel supported thereon to said press, and actuator means associated with said press and responsive to relative closing movement of said first and second press plates to actuate said shifting means to move said lever with said support surface gradually outwardly of said press during closing movement of said press.

2. A device according to claim 1, wherein said lever means includes a clamping lever engageable over the top of said panel and being pivotally mounted to position said clamping lever on top of said panel and to move it to a position spaced outwardly from said panel.

3. A device according to claim 1, wherein said shifting means comprises a shifting lever associated with said pivotal lever means and projecting outwardly toward the panel and the press therefrom, said shifting lever being actuated by movement of one of said press plates to cause shifting of said lever means.

4. A device according to claim 1, wherein said lever means comprises a parallel linkage including parallel first and second lever members pivoted to said carriage, said support lever member forming the outer portion of said parallel linkage being pivotally connected to the outer end of said first and second lever members and extending outwardly therebeyond.

5. A device according to claim 4, wherein said support lever includes a support roller at its outer end engageable with a panel, a clamping lever pivoted to the outer one of said first and second levers and having a surface engageable over the top of the panel, and means to rotate said clamping lever to clamp and release the panel.

6. A device according to claim 5, wherein said actuator means comprises a bearing beam extending outwardly from one of said press plates, said shifter means comprising an arm portion of said first lever which extends outwardly from said parallel linkage toward the press plate and is engageable by said beam to shift said lever means during upward movement of said press plate.

7. A device according to claim 1, including means located between said support and said press for charging the board as it is moved thereby.

8. A device according to claim 1, wherein there are a plurality of separate pickup mechanisms extending along the length of said carriage.

* * * * *